United States Patent
Yoshioka et al.

(10) Patent No.: US 11,943,720 B2
(45) Date of Patent: Mar. 26, 2024

(54) USER EQUIPMENT AND BASE STATION APPARATUS

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 118 days.

(21) Appl. No.: 17/297,833

(22) PCT Filed: Jan. 10, 2019

(86) PCT No.: PCT/JP2019/000581
§ 371 (c)(1),
(2) Date: May 27, 2021

(87) PCT Pub. No.: WO2020/144825
PCT Pub. Date: Jul. 16, 2020

(65) Prior Publication Data
US 2022/0015043 A1      Jan. 13, 2022

(51) Int. Cl.
*H04W 52/36* (2009.01)
*H04W 4/06* (2009.01)
*H04W 52/34* (2009.01)

(52) U.S. Cl.
CPC ............. *H04W 52/36* (2013.01); *H04W 4/06* (2013.01); *H04W 52/34* (2013.01)

(58) Field of Classification Search
CPC ....... H04W 52/36; H04W 4/06; H04W 52/34; H04W 72/10; H04W 72/0453
See application file for complete search history.

(56) References Cited

U.S. PATENT DOCUMENTS

| | | | |
|---|---|---|---|
| 2020/0205166 A1* | 6/2020 | Huang | H04W 76/27 |
| 2020/0228247 A1* | 7/2020 | Guo | H04W 52/383 |
| 2021/0288759 A1* | 9/2021 | Lee | H04W 76/11 |
| 2021/0360551 A1* | 11/2021 | Kwak | H04L 5/0048 |

FOREIGN PATENT DOCUMENTS

JP     2017-505088 A     2/2017

OTHER PUBLICATIONS

Partial Supplementary European Search Report issued in counterpart European Patent Application No. 19908525.9, dated Jul. 8, 2022 (17 pages).
LG Electronics; "Discussion on physical layer procedure for NR V2X"; 3GPP TSG RAN WG1 Meeting #95, R1-1812842; Spokane, USA, Nov. 12-16, 2018 (6 pages).

(Continued)

*Primary Examiner* — John J Lee
(74) *Attorney, Agent, or Firm* — Osha Bergman Watanabe & Burton LLP

(57) ABSTRACT

A user equipment includes a transmitting unit configured to transmit a groupcast to a group including a plurality of user equipments, a receiving unit configured to receive a response related to a retransmission control for the groupcast, and a control unit configured to control a leakage power to another channel arranged by frequency division with a channel via which a response related to the retransmission control for the groupcast is received.

6 Claims, 11 Drawing Sheets

(56) References Cited

OTHER PUBLICATIONS

OPPO; "Physical layer procedure for NR-V2X"; 3GPP TSG RAN WG1 Meeting #95, R1-1812811; Spokane, USA, Nov. 12-16, 2018 (5 pages).
LG Electronics; "Discussion on physical layer procedure for NR V2X"; 3GPP TSG RAN WG1 Meeting #95, R1-1813860 (revision of R1-1812841); Spokane, USA, Nov. 12-16, 2018 (6 pages).
International Search Report issued in PCT/JP2019/000581 dated Mar. 19, 2019 (4 pages).
Written Opinion of the International Searching Authority issued in PCT/JP2019/000581 dated Mar. 19, 2019 (4 pages).
MediaTek Inc.; "Discussion on physical layer procedure"; 3GPP TSG RAN WG1 Meeting #95, R1-1812365; Spokane, USA; Nov. 12-16, 2018 (6 pages).
3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).
3GPP TS 36.211 V15.3.0; "3rd Generation Partnership Project; Technical Specification Group Radio Access Network; Evolved Universal Terrestrial Radio Access (E-UTRA); Physical channels and modulation (Release 15)"; Sep. 2018 (243 pages).
Office Action in the counterpart Chinese Application No. 201980087662.8, dated Jul. 6, 2023 (19 pages).

\* cited by examiner

USER EQUIPMENT AND BASE STATION APPARATUS

TECHNICAL FIELD

The present invention relates to user equipment and a base station apparatus in a wireless communication system.

BACKGROUND ART

In LTE (Long Term Evolution) and successor systems of LTE (for example, LTE-A (LTE Advanced), NR (New Radio) (also referred to as 5G)), D2D (Device to Device) technology in which user equipment communicates directly without using a base station apparatus has been studied (for example, see Non-Patent Document 1).

D2D reduces traffic between user equipment and a base station apparatus, and enables communication between user equipment even when the base station apparatus becomes unavailable during a disaster. In 3GPP (3rd Generation Partnership Project), D2D is referred to as a "sidelink", but in this specification, D2D, which is a more general term, is used. However, in the explanation about the embodiment described later, the term "sidelink" will also be used as necessary.

D2D communication is roughly divided into D2D discovery for discovering other user equipment that can communicate, and D2D communication (also referred to as inter-terminal direct communication and the like) for directly communicating between user equipment. Hereinafter, when D2D communication, D2D discovery, and the like are not particularly distinguished from each other, they will be simply referred to as D2D. A signal transmitted and received by D2D will be referred to as a D2D signal. Various use cases of services relating to V2X (Vehicle to Everything) in NR are being studied (for example, Non-Patent Document 2).

RELATED ART DOCUMENT

Non-Patent Document

Non-Patent Document 1: 3GPP TS 36.211 V15.3.0 (2018-09)
Non-Patent Document 2: 3GPP TR 22.886 V15.1.0 (2017-03)

SUMMARY OF THE INVENTION

Problem to be Solved by the Invention

Support for HARQ (Hybrid automatic repeat request) is being studied in direct communication between terminals in NR-V2X. However, when transmitting a HARQ response with groupcast, a leakage power from a channel transmitting the HARQ response to adjacent channels has not been considered.

The present invention has been made in view of the above problems, and it is an object of the present invention to appropriately transmit a response related to retransmission control in direct communication between terminals.

Means for Solving Problem

According to the disclosed technique, provided is a user equipment including a transmitting unit configured to transmit a groupcast to a group including a plurality of user equipments, a receiving unit configured to receive a response related to a retransmission control for the groupcast, and a control unit configured to control a leakage power to another channel arranged by frequency division with a channel via which a response related to the retransmission control for the groupcast is received.

Effect of the Invention

According to the disclosed technique, a response related to retransmission control in direct communication between terminals can be appropriately transmitted.

MODE FOR CARRYING OUT THE INVENTION

An embodiment of the present invention will be hereinafter described with reference to drawings. The embodiment described below is an example, and the embodiment to which the present invention is applied is not limited to the following embodiment.

In operation of a wireless communication system according to embodiment of the present invention, existing techniques are used as appropriate. However, an example of existing technique includes an existing LTE, but is not limited to the existing LTE. In addition, the term "LTE" used in this specification has a broad meaning including LTE- Advanced, specifications newer than LTE-Advanced (e.g., NR), or wireless LAN (Local Area Network) unless otherwise specified.

In the embodiment of the present invention, the duplex method may be a TDD (Time Division Duplex) system, an FDD (Frequency Division Duplex) system, or others (for example, Flexible Duplex and the like).

Further, in the embodiment of the present invention, "to configure" a radio parameter or the like may be that a predetermined value is configured in advance (Pre-configure), or that a radio parameter indicated by a base station apparatus 10 or user equipment 20 is set.

Figure 1:
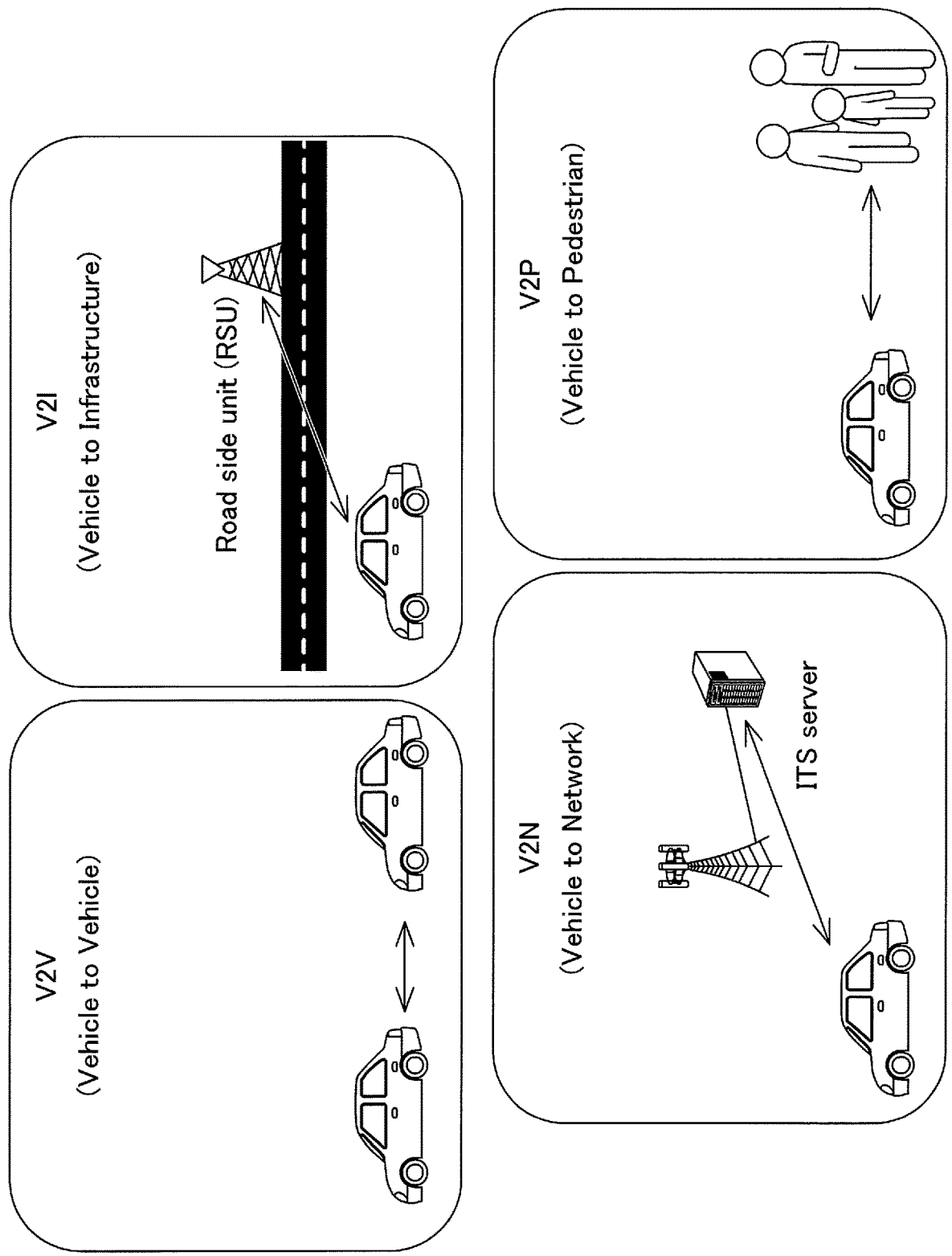
FIG. 1 is a drawing for explaining V2X.

FIG. 1 is a drawing for explaining V2X. In 3GPP, the implementation of V2X (Vehicle to Everything) or eV2X (enhanced V2X) by extending the D2D function has been discussed, and V2X and eV2X are being fixed as technical specifications. As illustrated in FIG. 1, V2X is a part of ITS (Intelligent Transport Systems) and is a general term including V2V (Vehicle to Vehicle) meaning a form of communication performed between vehicles, a V2I (Vehicle to Infrastructure) meaning a form of communication performed between a vehicle and a road-side unit (RSU) installed on a roadside, a V2N (Vehicle to Network) meaning a form of communication performed between a vehicle and an ITS server, and a V2P (Vehicle to Pedestrian) meaning a form of communication performed between a vehicle and a mobile terminal carried by a pedestrian.

In 3GPP, V2X using LTE or NR cellular communication and inter-terminal communication is being studied. V2X using cellular communication is also referred to as cellular V2X. NR-based V2X is being studied to achieve a higher capacity, a lower delay, a higher reliability, and QoS (Quality of Service) control.

It is anticipated that discussions not limited to 3GPP specifications will be advanced in the future for LTE or NR-based V2X. It is expected that the following items will be discussed, for example, ensuring interoperability, reducing costs by implementing higher layers, methods for using or switching multiple RATS (Radio Access Technology), handling regulations in various countries, data acquisition, distribution, database management, and usage methods for LTE or NR-based V2X platforms.

In the embodiment of the present invention, a communication apparatus is mainly assumed to be mounted on a vehicle, but the embodiment of the present invention is not limited thereto. For example, the communication apparatus may be a terminal held by a person, or the communication apparatus may be an apparatus mounted on a drone or an aircraft, the communication apparatus may be a base station, an RSU, a relay station (relay node), a user equipment having scheduling capability, or the like.

SL (Sidelink) may be distinguished from UL (Uplink) or DL (Downlink) based on any one of or a combination of items (1) to (4) below. SL may be given a different name.
(1) Time domain resource assignment
(2) Frequency domain resource assignment
(3) Reference synchronization signals (including SLSS (Sidelink Synchronization Signal)
(4) Reference signal used for path loss measurement for transmission power control OFDM (Orthogonal Frequency Division Multiplexing) techniques for SL or UL may be any one of OFDM techniques including CP-OFDM (Cyclic-Prefix OFDM), DFT-S-OFDM (Discrete Fourier Transform-Spread-OFDM), OFDM without transform precoding, and OFDM with transform precoding.

In SL of LTE, Mode 3 and Mode 4 are defined for SL resource assignment to user equipment 20. In Mode 3, transmission resources are dynamically assigned by DCI (Downlink Control Information) transmitted from the base station apparatus 10 to the user equipment 20. In Mode 3, SPS (Semi Persistent Scheduling) is also possible. In Mode 4, user equipment 20 autonomously selects a transmission resource from the resource pool.

A slot in the embodiment of the present invention may be read as a symbol, a mini-slot, a subframe, a radio frame, a TTI (Transmission Time Interval), or the like. Further, a cell in the embodiment of the present invention may be read as a cell group, a carrier component, a BWP, a resource pool, a resource, a RAT (Radio Access Technology), a system (including a wireless LAN), or the like.

Figure 2:
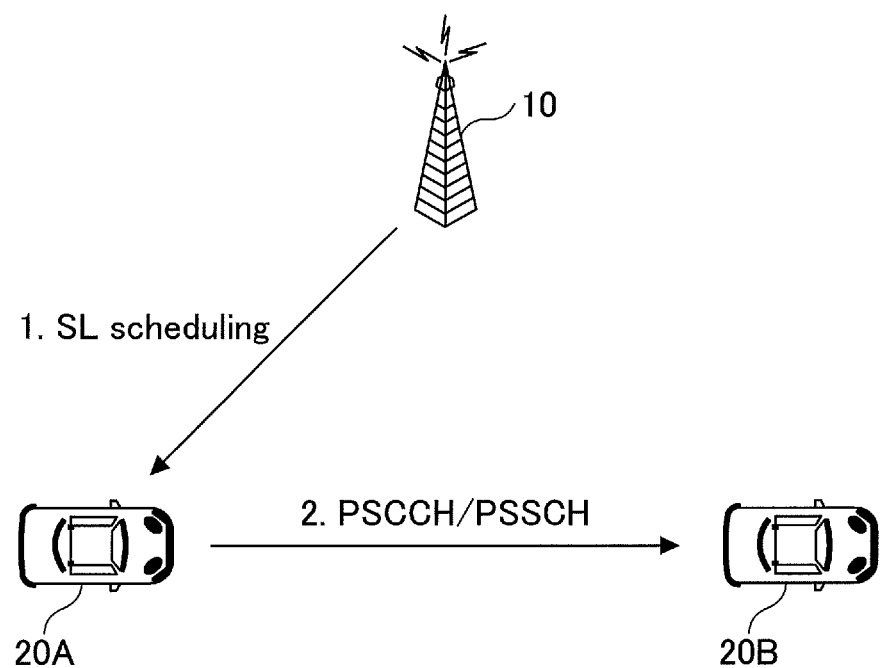
FIG. 2 is a drawing for explaining an example (1) of transmission mode of V2X.

FIG. 2 is a drawing for explaining an example (1) of transmission mode of V2X. In a sidelink communication transmission mode illustrated in FIG. 2, in step 1, the base station apparatus 10 transmits sidelink scheduling to user equipment 20A. Subsequently, the user equipment 20A transmits a PSCCH (Physical Sidelink Control Channel) and a PSSCH (Physical Sidelink Shared Channel) to user equipment 20B based on the received scheduling (step 2). The transmission mode of the sidelink communication illustrated in FIG. 2 may be referred to as a sidelink transmission mode 3 in LTE. The sidelink transmission mode 3 in LTE performs Uu-based sidelink scheduling. Uu is a radio interface between UTRAN (Universal Terrestrial Radio Access Network) and UE (User Equipment). Note that the transmission mode of sidelink communication illustrated in FIG. 2 may be referred to as a sidelink transmission mode 1 in NR.

Figure 3:
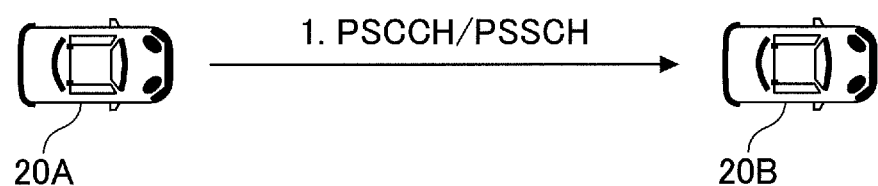
FIG. 3 is a drawing for explaining an example (2) of transmission mode of V2X.

FIG. 3 is a drawing for explaining an example (2) of transmission mode of V2X. In a sidelink communication transmission mode illustrated in FIG. 3, in step 1, the user equipment 20A transmits PSCCH and PSSCH to the user equipment 20B using the autonomously selected resource. The transmission mode of the sidelink communication illustrated in FIG. 3 may be referred to as a sidelink transmission mode 4 in LTE. In the sidelink transmission mode 4 in LTE, the UE itself performs resource selection.

Figure 4:
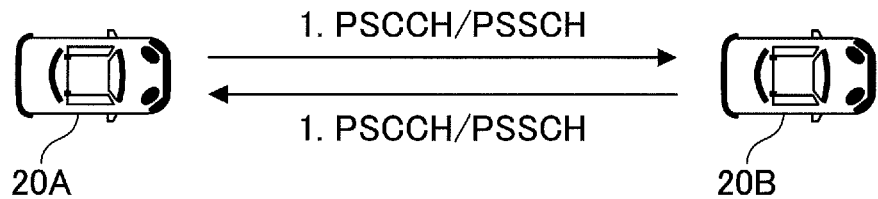
FIG. 4 is a drawing for explaining an example (3) of transmission mode of V2X.

FIG. 4 is a drawing for explaining an example (3) of transmission mode of V2X. In the sidelink communication transmission mode illustrated in FIG. 4, in step 1, the user equipment 20A transmits PSCCH and PSSCH to the user equipment 20B using an autonomously selected resource. Likewise, the user equipment 20B transmits PSCCH and PSSCH to the user equipment 20A using the autonomously selected resource (step 1). The transmission mode of sidelink communication illustrated in FIG. 4 may be referred to as a sidelink transmission mode 2a in NR. In the sidelink transmission mode 2 in NR, the UE itself executes resource selection.

Figure 5:
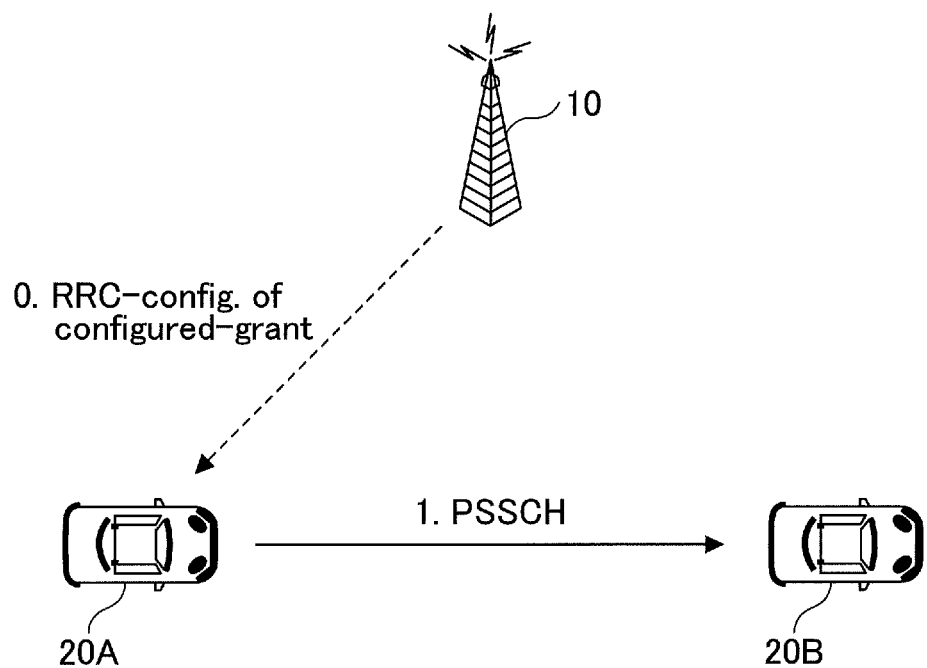
FIG. 5 is a drawing for explaining an example (4) of transmission mode of V2X.

FIG. 5 is a drawing for explaining an example (4) of transmission mode of V2X. In the sidelink communication transmission mode illustrated in FIG. 5, in step 0, the base station apparatus 10 transmits a scheduling grant of a sidelink to the user equipment 20A via RRC (Radio Resource Control) configuration. Subsequently, the user equipment 20A transmits PSSCH to the user equipment 20B based on the received scheduling (step 1). Alternatively, the user equipment 20A transmits PSSCH to the user equipment 20B based on configurations determined in advance according to specifications. The transmission mode of sidelink communication illustrated in FIG. 5 may be referred to as a sidelink transmission mode 2c in NR.

Figure 6:
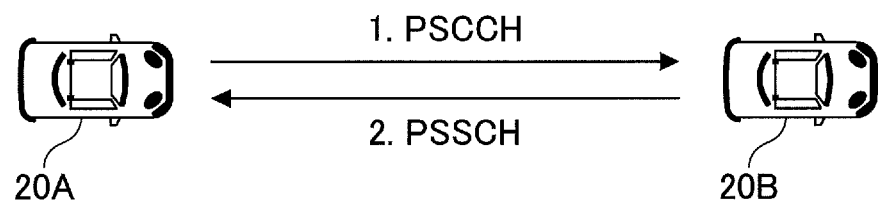
FIG. 6 is a drawing for explaining an example (5) of transmission mode of V2X.

FIG. 6 is a drawing for explaining an example (5) of transmission mode of V2X. In a sidelink communication transmission mode illustrated in FIG. 6, in step 1, the user equipment 20A transmits sidelink scheduling to the user equipment 20B via PSCCH. Subsequently, the user equipment 20B transmits PSSCH to the user equipment 20A based on the received scheduling (step 2). The transmission mode of the sidelink communication illustrated in FIG. 6 may be referred to as a sidelink transmission mode 2d in NR.

Figure 7:
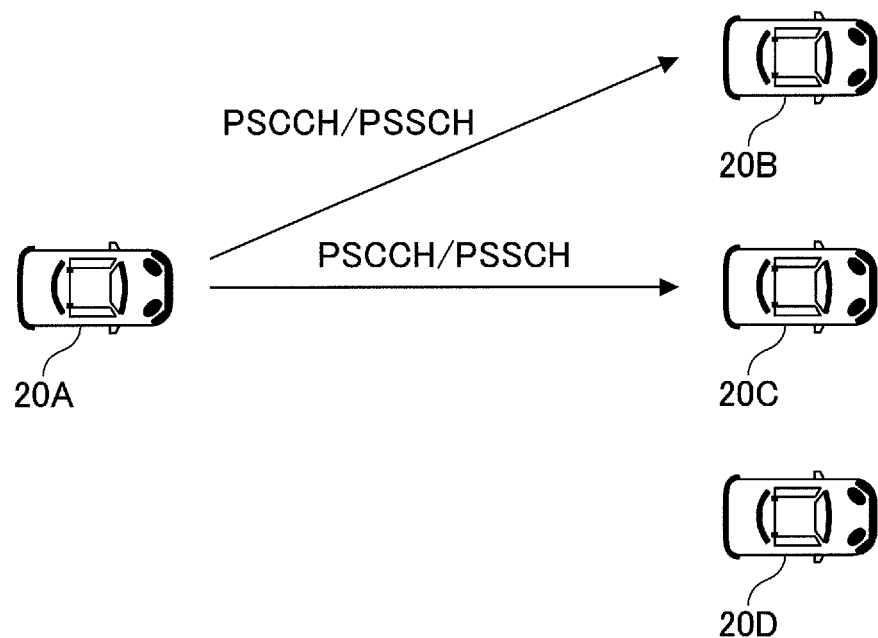
FIG. 7 is a drawing for explaining an example (1) of a communication type of V2X.

FIG. 7 is a drawing for explaining an example (1) of a communication type of V2X. The communication type of the sidelink illustrated in FIG. 7 is unicast. The user equipment 20A transmits PSCCH and PSSCH to the user equipment 20. In the example illustrated in FIG. 7, the user equipment 20A performs unicast to the user equipment 20B and performs unicast to the user equipment 20C.

Figure 8:
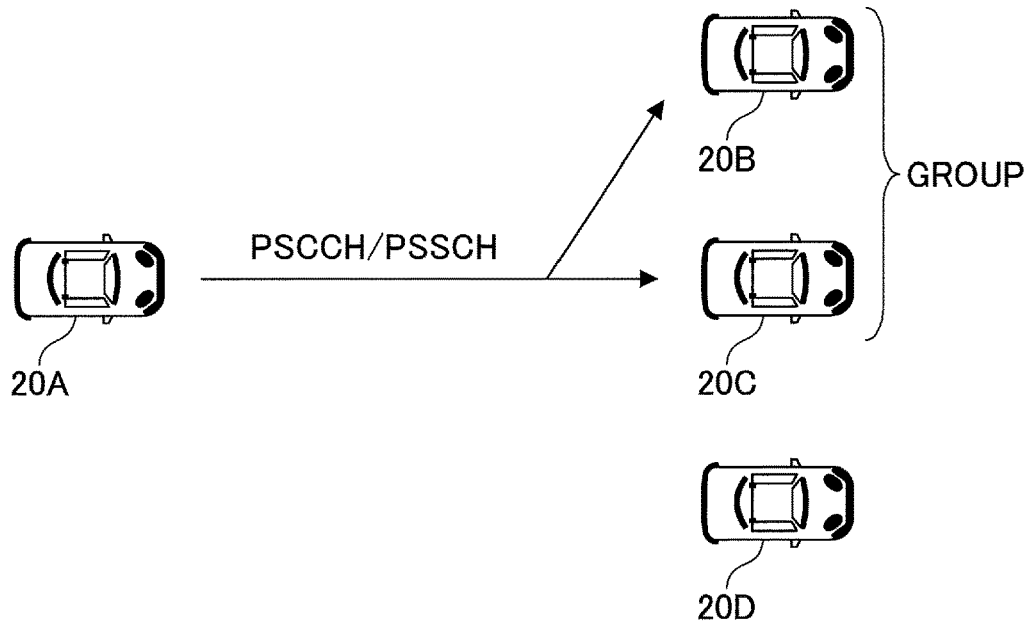
FIG. 8 is a drawing for explaining an example (2) of a communication type of V2X.

FIG. 8 is a drawing for explaining an example (2) of a communication type of V2X. The sidelink communication type illustrated in FIG. 8 is groupcast. The user equipment 20A transmits PSCCH and PSSCH to a group to which one or more user equipments 20 belong. In the example illustrated in FIG. 8, the group includes the user equipment 20B and the user equipment 20C, and the user equipment 20A performs groupcast to the group.

Figure 9:
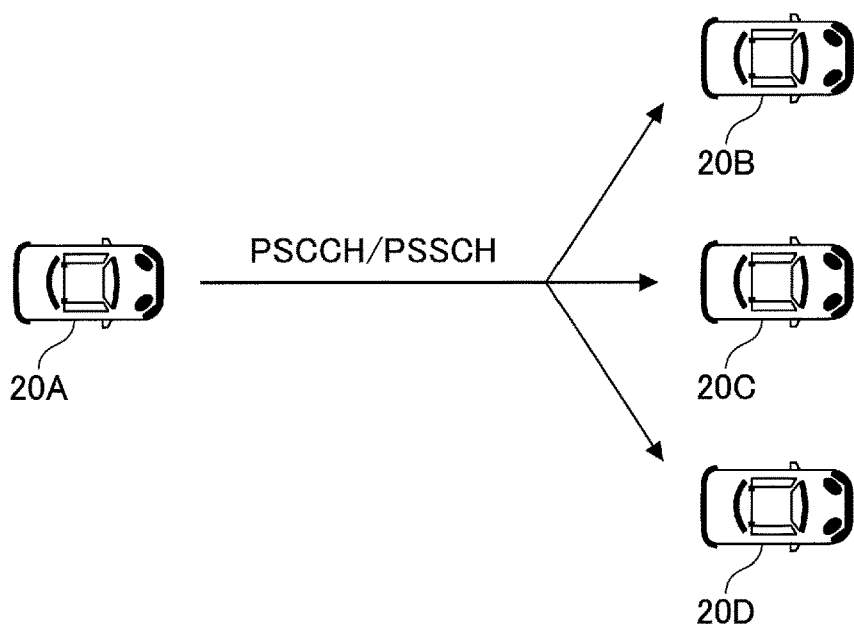
FIG. 9 is a drawing for explaining an example (3) of a communication type of V2X.

FIG. 9 is a drawing for explaining an example (3) of a communication type of V2X. The communication type of the sidelink illustrated in FIG. 9 is broadcast. The user equipment 20A transmits PSCCH and PSSCH to one or a plurality of user equipments 20. In the example illustrated in FIG. 9, the user equipment 20A performs broadcast to the user equipment 20B, the user equipment 20C, and user equipment 20D.

In NR-V2X, HARQ is supported for unicast and groupcast of sidelink. Further, in NR-V2X, SFCI (Sidelink Feedback Control Information) including a HARQ response is defined. Furthermore, it is studied that SFCI is transmitted via PSFCH (Physical Sidelink Feedback Channel).

Here, only one physical resource is used for PSSCH transmission for performing unicast or groupcast. However, in a case where the communication type is a groupcast and both ACK and NACK are transmitted as HARQ responses, many PSFCH resources are consumed.

Therefore, the following options (1) and (2) are conceivable.

(1) Only in a case of NACK, a HARQ response is transmitted, and all the user equipments 20 included in the group transmit an HARQ response using a single PSFCH resource.

(2) In the case of either ACK or NACK, a HARQ response is transmitted, and the user equipments 20 included in the group transmit a HARQ response using different PSFCH resources.

In a case where the option (1) is adopted, there is an advantage in that less resources are consumed. In a case where the option (2) is adopted, there is an advantage in that the reliability is improved.

Figure 10:
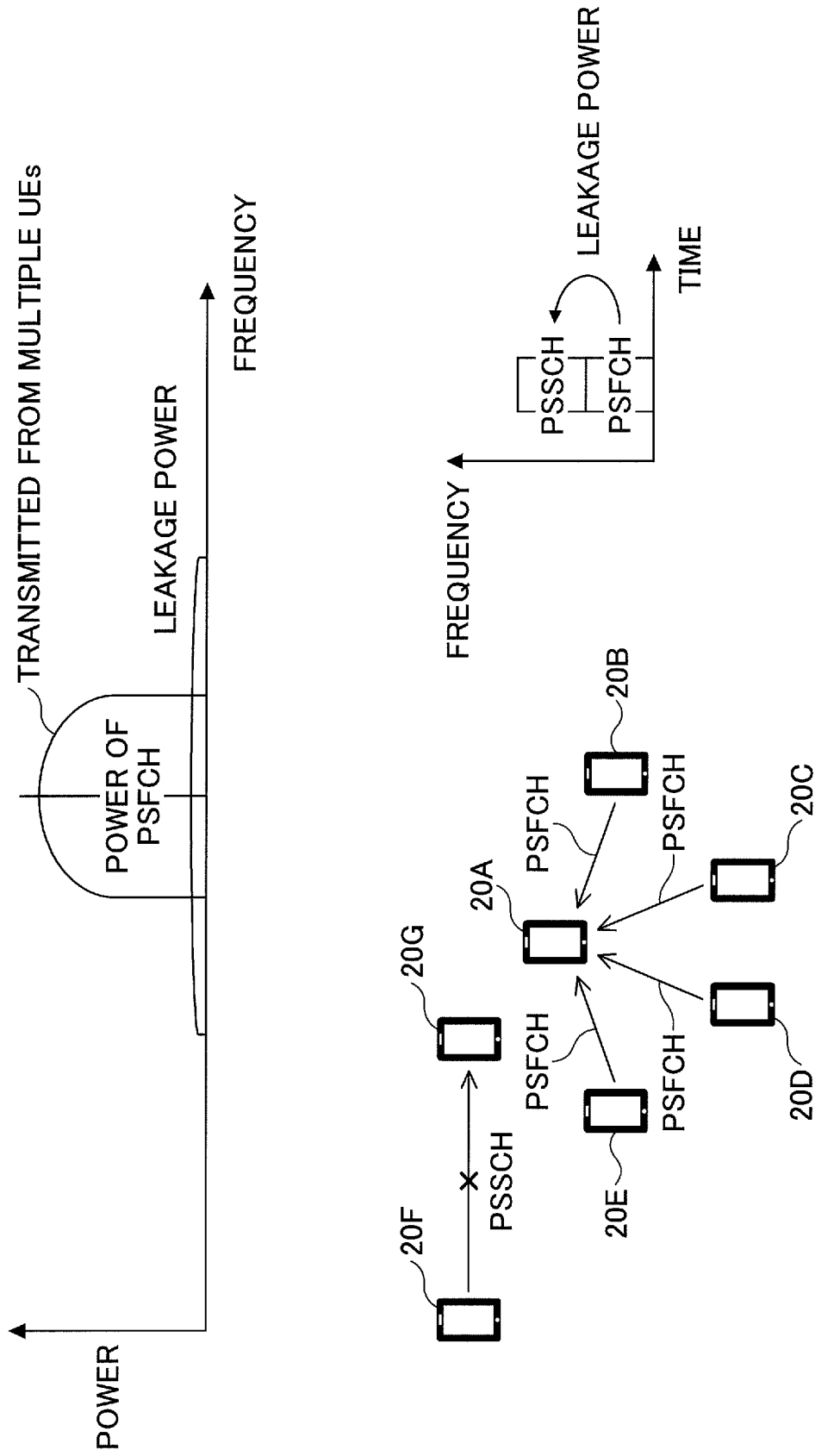
FIG. 10 is a drawing for explaining an example of a HARQ response during groupcast.

FIG. 10 is a drawing for explaining an example of a HARQ response during groupcast. The transmission power of PSFCH that is a channel for transmitting HARQ responses needs to be determined appropriately. In particular, in a case where the above option (1) is adopted, multiple user equipments 20 that receive groupcast transmit HARQ responses with the same PSFCH resource, and accordingly, there is a problem in the leakage power to adjacent channels of PSFCH as illustrated in FIG. 10.

The user equipment 20A illustrated in FIG. 10 performs groupcast to a user equipment 20B, a user equipment 20C, a user equipment 20D, and a user equipment 20E. Subsequently, the user equipment 20B, the user equipment 20C, the user equipment 20D, and the user equipment 20E transmit PSFCH to the user equipment 20A and a HARQ response with the same PSFCH resource. Here, in a case where the user equipment 20F illustrated in FIG. 10 transmits PSSCH to the user equipment 20G, there may be a situation in which the leakage power from PSFCH transmitted from the user equipment 20B, the user equipment 20C, the user equipment 20D, and the user equipment 20E interferes with PSSCH transmitted from the user equipment 20F.

Hereinafter, a method for setting or controlling the transmission power of the HARQ response in PSFCH will be described. The following description of "transmission power" may correspond to "transmission power" or may correspond to "PSD (Power spectral density)".

For example, the transmission power of the HARQ response may be fixedly set or may be fixedly defined in advance. The transmission power of the HARQ response may be set for each user equipment 20 or may be defined in advance for each user equipment 20.

Figure 11:
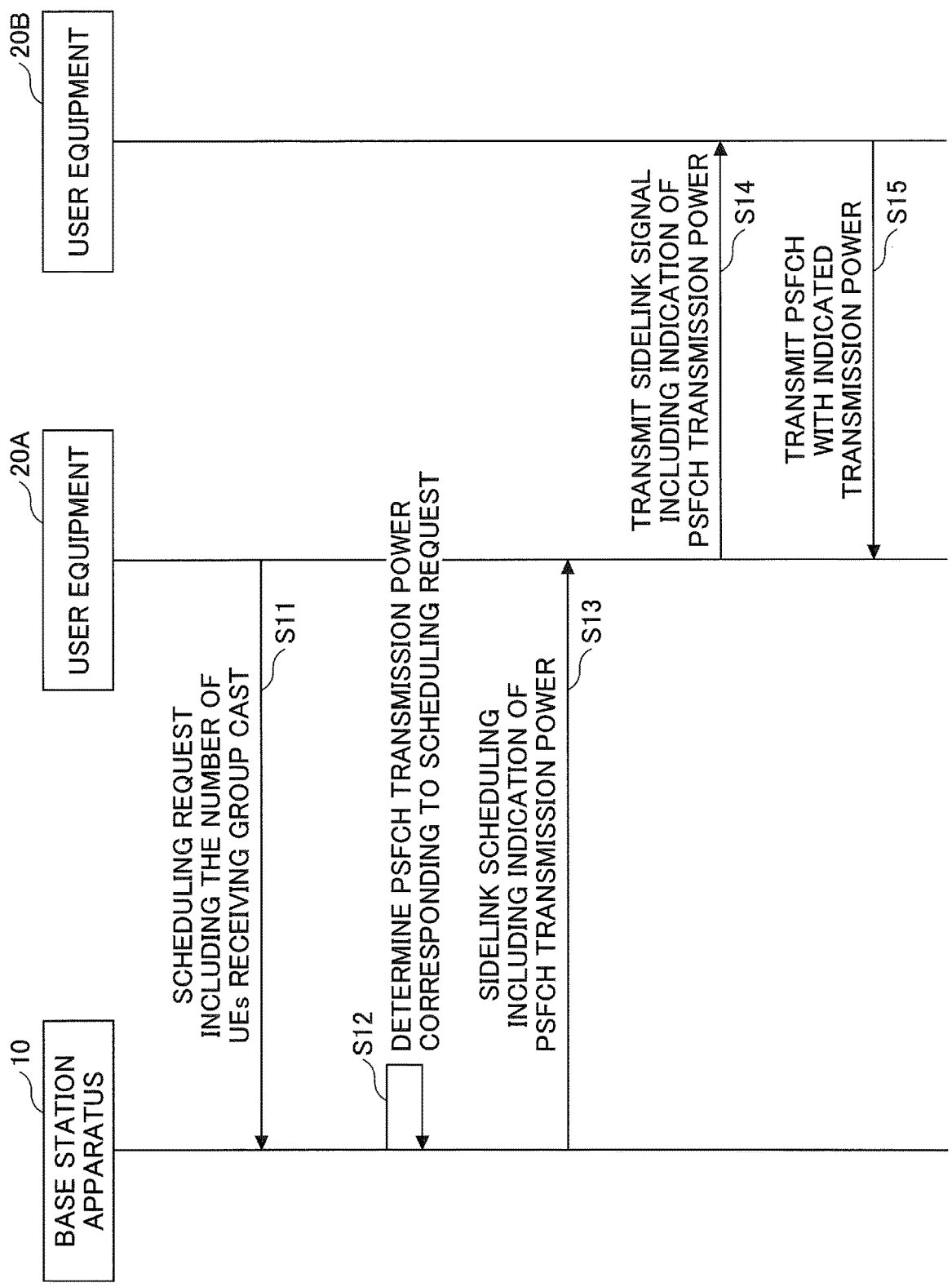
FIG. 11 is a sequence drawing for explaining an example (1) of a HARQ response during groupcast according to an embodiment of the present invention.

FIG. 11 is a sequence drawing for explaining an example (1) of a HARQ response during groupcast according to an embodiment of the present invention. For example, the transmission power of the HARQ response may be dynamically set or may be defined in advance. The transmission power may be set as an absolute value or set with an offset or may be defined in advance. For each user equipment 20, one or more absolute values may be determined and indicated, or one or more offsets may be determined and indicated.

When the base station apparatus 10 or the user equipment 20 having scheduling capability dynamically determines the transmission power of HARQ response for each user, a user equipment 20 performing sidelink transmission may report a status in sidelink transmission to a base station apparatus 10 or the user equipment 20 having scheduling capability. The status in the sidelink transmission may be, for example, the number of UEs receiving groupcast.

In step S11 illustrated in FIG. 11, the user equipment 20A that performs groupcast transmits a scheduling request including the number of reception-side UEs of groupcast to the base station apparatus 10. Subsequently, the base station apparatus 10 determines a PSFCH transmission power for each UE or common to the UEs, based on the received number of reception-side UEs of groupcast (S12). For example, the base station apparatus 10 may decrease the PSFCH transmission power as the number of groupcast reception-side UEs increases. Subsequently, the base station apparatus 10 transmits sidelink scheduling including the indication of PSFCH transmission power determined in step S12 to the user equipment 20A (S13).

In step S14, the user equipment 20A transmits in groupcast a sidelink signal including the indication of PSFCH transmission power received in step S13 to the group including the user equipment 20B. The group includes one or a plurality of user equipments 20 other than the user equipment 20B, and the user equipments 20 included in the group receive the sidelink signal including the indication of PSFCH transmission power, in a manner similar to the user equipment 20B. Subsequently, the user equipment 20B applies the indicated PSFCH transmission power based on the reception state of the groupcasted sidelink signal and transmits an HARQ response via PSFCH (S15). The user equipments 20 that have received the groupcast apply the indicated PSFCH transmission power in a manner similar to the user equipment 20B, and transmit HARQ responses via PSFCH.

It should be noted that the base station apparatus 10 illustrated in FIG. 11 may be replaced with the user equipment 20 having scheduling capability. Further, the sidelink signal transmission from the user equipment 20A to the user equipment 20B illustrated in FIG. 11 may be unicast. When the sidelink signal transmission is unicast, the number of reception-side UEs in the groupcast may be 1.

Figure 12:
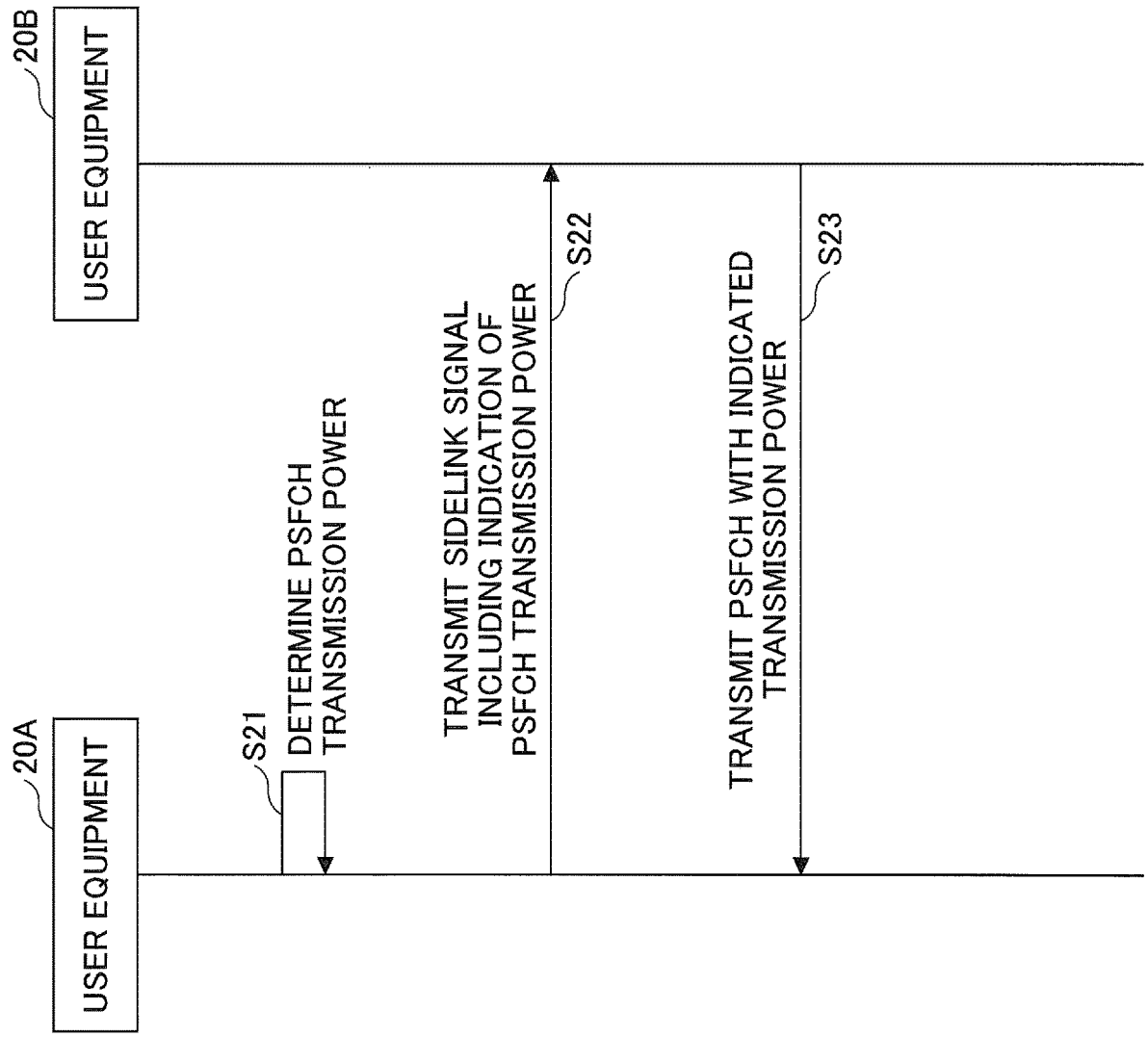
FIG. 12 is a sequence drawing for explaining an example (2) of a HARQ response during groupcast according to an embodiment of the present invention.

FIG. 12 is a sequence drawing for explaining an example (2) of a HARQ response during groupcast according to an embodiment of the present invention. When a user equipment 20 performing groupcast dynamically determines the transmission power of HARQ response for each user, the transmission power of PSFCH with which the corresponding HARQ response is transmitted may be set or may be defined in advance, in a user equipment 20 performing sidelink transmission, based on the status in the sidelink transmission. The status in the sidelink transmission may be, for example, the number of reception-side UEs of groupcast, or may be a power offset value with respect to the transmission power of PSCCH or PSSCH via which groupcast is transmitted.

In step S21 illustrated in FIG. 12, the user equipment 20A performing the groupcast determines the PSFCH transmission power based on the number of reception-side UEs of the groupcast or the power offset value with respect to the transmission power of the PSCCH or PSSCH via which the groupcast is transmitted. Subsequently, the user equipment 20A transmits in groupcast a sidelink signal including the indication of PSFCH transmission power determined in step S21 to the group including the user equipment 20B (S22). The group includes one or a plurality of user equipments 20 in addition to the user equipment 20B, and the user equipments 20 included in the group receive the sidelink signal including the indication of PSFCH transmission power, in a manner similar to the user equipment 20B. Subsequently, the user equipment 20B applies the indicated PSFCH transmission power based on the reception state of the groupcasted sidelink signal and transmits a HARQ response via PSFCH (S23). The user equipments 20 that have received the groupcast apply the PSFCH transmission power indicated in a manner similar to the user equipment 20B, and transmit HARQ responses via PSFCH.

Note that the sidelink signal transmission from the user equipment 20A to the user equipment 20B illustrated in FIG. 12 may be unicast. When the sidelink signal transmission is unicast, the number of reception-side UEs in the groupcast may be 1.

In addition, "PSFCH transmission power indication" in FIG. 11 and FIG. 12 may be indicated via a physical layer signal link or a higher layer signaling such as SCI (Sidelink Control Information), DCI (Downlink Control Information), MAC (Medium Access Control) CE (Control Element), RRC, and the like. In the physical layer signal link or the higher layer signaling, which signaling is to be used or set may be defined in advance based on the sidelink transmission mode explained in FIG. 2 to FIG. 5.

Note that the method of fixedly setting the transmission power of the HARQ response and the method of dynamically setting the transmission power of the HARQ response may be executed in combination. Whether the method of setting the transmission power of the HARQ response fixedly described above or the method of dynamically setting the transmission power of the HARQ response is executed may be determined according to the communication type such as unicast or groupcast.

The leakage power from PSFCH to the adjacent channels can be controlled by the method of fixedly setting the transmission power of the HARQ response or the method of dynamically setting the transmission power of the HARQ response.

Figure 13:
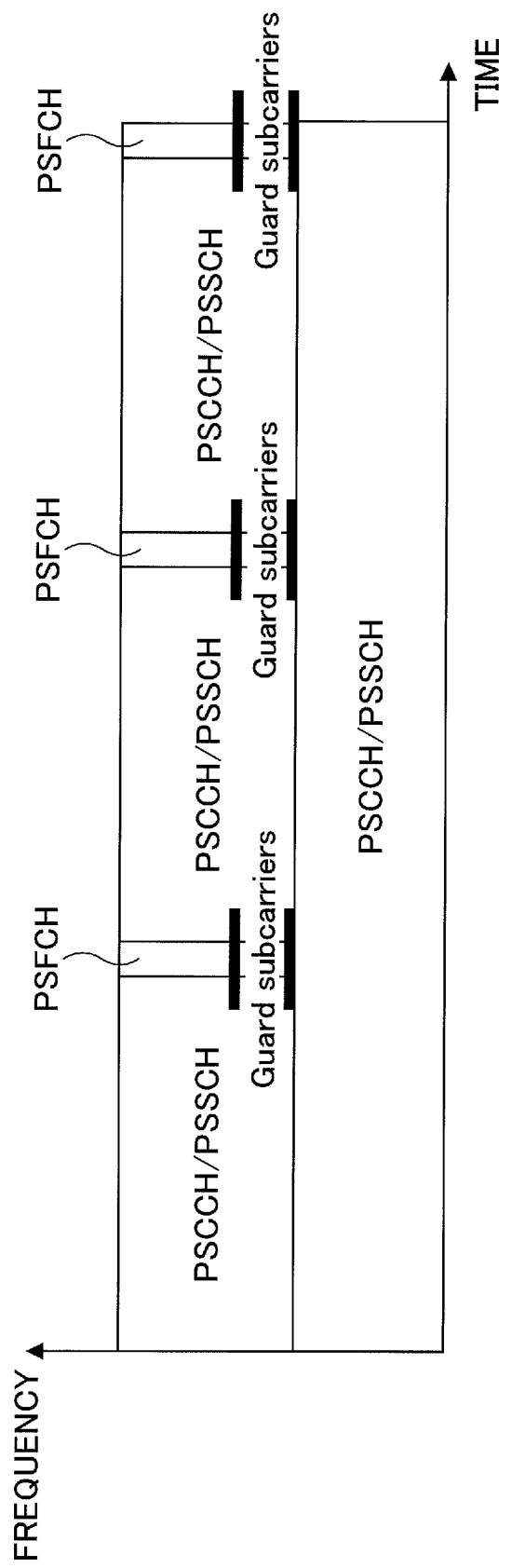
FIG. 13 is a drawing for explaining an example of channel arrangement in an embodiment of the present invention.

FIG. 13 is a drawing for explaining an example of channel arrangement in an embodiment of the present invention. The leakage power from PSFCH to adjacent channels may be controlled by the channel arrangement of PSFCH. For example, PSFCH for the HARQ response of groupcast may be set in time division with other channels or may be defined in advance.

Also, for example, as illustrated in FIG. 13, PSFCH for HARQ response of groupcast is arranged in frequency division with other channels, and further, guard subcarriers may be arranged between another channel and PSFCH. The guard subcarrier may be, for example, a guard band, a guard PRB (Physical Resource Block), a guard subchannel, or the like. Another channel adjacent to PSFCH having the guard subcarrier interposed therebetween may be PSCCH, PSSCH, PSFCH for unicast HARQ response, or the like.

The operation of the user equipment 20 relating to the guard subcarrier may be defined based on a sidelink transmission mode described with reference to FIG. 2 to FIG. 5. For example, in the sidelink transmission mode 1 or 2d, the user equipment 20 does not expect any other channel to be transmitted or scheduled on the guard subcarrier. Further, for example, in the sidelink transmission mode 2a or 2c, the user equipment 20 selects resources in the frequency domain excluding guard subcarriers for transmission of other channels. Also, for example, if any other channel can be transmitted on the guard subcarrier, the transmission on that other channel is dropped.

The guard subcarrier may be set or may be defined in advance. For example, the guard subcarrier may be set by a higher layer signaling such as RRC. The time domain in which guard subcarriers are arranged may have at least the length of PSFCH in time domain for HARQ response with groupcast.

According to the above embodiment, the user equipment 20 and the base station apparatus 10 can suppress leakage power from PSFCH to adjacent channels according to either the method of fixedly setting the transmission power of PSFCH via which the HARQ response is transmitted or the method of dynamically setting the transmission power of PSFCH via which the HARQ response is transmitted. The user equipment 20 may suppress the leakage power from PSFCH to adjacent channels by the channel arrangement of PSFCH including the guard subcarrier.

Therefore, a response related to retransmission control can be appropriately transmitted in direct communication between terminals.

<Apparatus Configuration>

Next, an example of functional configuration of the base station apparatus 10 and the user equipment 20 that execute the processing and operations described so far will be described. The base station apparatus 10 and the user equipment 20 include a function for implementing the above-described embodiment. However, each of the base station apparatus 10 and the user equipment 20 may have only some of the functions in the embodiment.

<Base Station Apparatus 10>

Figure 14:
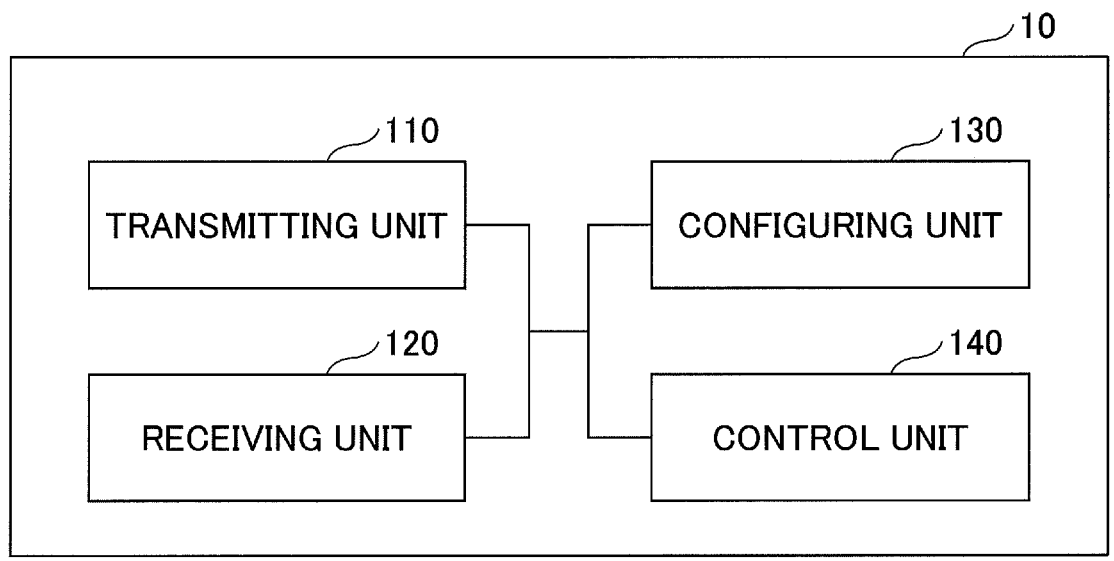
FIG. 14 is a drawing illustrating an example of a functional configuration of a base station apparatus 10 according to an embodiment of the present invention.

FIG. 14 is a drawing illustrating an example of a functional configuration of the base station apparatus 10. As illustrated in FIG. 14, the base station apparatus 10 includes a transmitting unit 110, a receiving unit 120, a configuring unit 130, and a control unit 140. The functional configuration illustrated in FIG. 14 is only an example. As long as the operation according to the embodiment of the present invention can be executed, the functions may be divided in any way, and the functional units may be given any names.

The transmitting unit 110 includes a function of generating signals to be transmitted to the user equipment 20 and wirelessly transmitting the signals. The receiving unit 120 includes a function of receiving various types of signals transmitted from the user equipment 20 and acquiring, for example, information on a higher layer from the received signals. Further, the transmitting unit 110 has a function of transmitting NR-PSS, NR-SSS, NR-PBCH, a DL/UL control signal, a DL reference signal or the like to the user equipment 20.

The configuring unit 130 stores configuration information configured in advance and various configuration information to be transmitted to the user equipment 20 in a storage device and reads out the setting information from the storage device as needed. The contents of the configuration information are, for example, information about configuration of D2D communication.

As described in the embodiment, the control unit 140 performs processing of configuration for allowing the user equipment 20 to perform D2D communication. Also, the control unit 140 transmits scheduling of D2D communication via the transmitting unit 110 to the user equipment 20. The control unit 140 determines the transmission power of the HARQ response of D2D communication and transmits the HARQ response to the user equipment 20 via the transmitting unit 110. A functional unit for transmitting signals in the control unit 140 may be included in the transmitting unit 110, and a functional unit for receiving signals in the control unit 140 may be included in the receiving unit 120.

<User Equipment 20>

Figure 15:
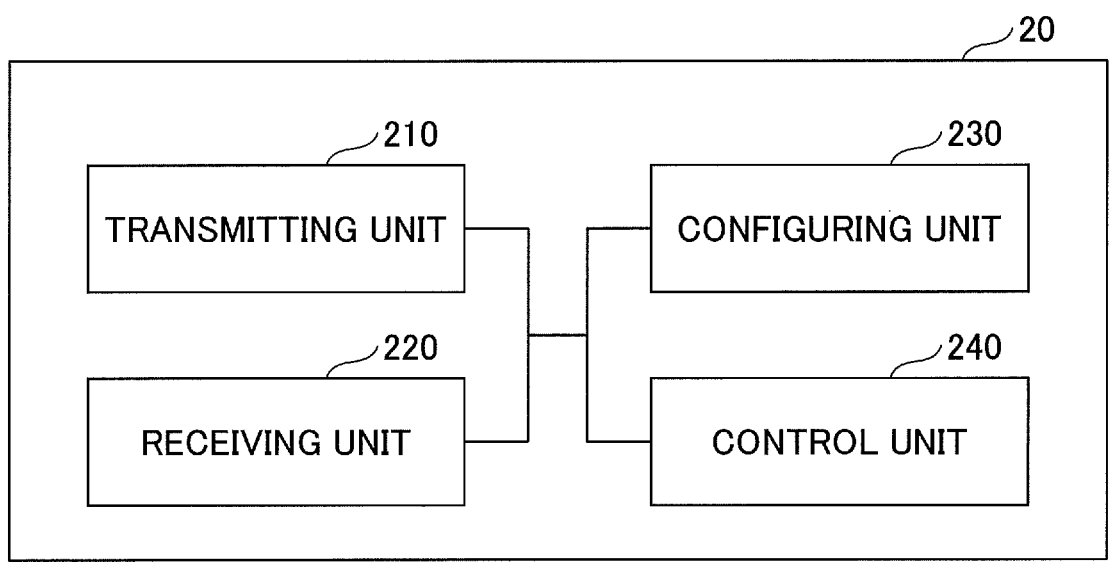
FIG. 15 is a drawing illustrating an example of a functional configuration of a user equipment 20 according to an embodiment of the present invention.

FIG. 15 is a drawing illustrating an example of a functional configuration of the user equipment 20. As illustrated in FIG. 15, the user equipment 20 includes a transmitting unit 210, a receiving unit 220, a configuring unit 230, and a control unit 240. The functional configuration illustrated in FIG. 15 is merely an example. As long as the operation according to the embodiment of the present invention can be executed, the functions may be divided in any way, and the functional units may be given any names.

The transmitting unit 210 generates a transmission signal from transmission data and wirelessly transmits the transmission signal. The receiving unit 220 wirelessly receives various types of signals, and acquires a signal in a higher-layer from the received signal in the physical layer. Also, the receiving unit 220 has a function of receiving NR-PSS, NR-SSS, NR-PBCH, DL/UL/SL control signals, reference signals, and the like that are transmitted from the base station apparatus 10. Also, for example, in D2D communication, the transmitting unit 210 transmits, to another user equipment 20, a PSCCH (Physical Sidelink Control Channel), a PSSCH (Physical Sidelink Shared Channel), a PSDCH (Physical Sidelink Discovery Channel), a PSBCH (Physical Sidelink Broadcast Channel), and the like. The receiving unit 220 receives the PSCCH, the PSSCH, the PSDCH, the PSBCH, and the like, from the another user equipment 20.

The configuring unit 230 stores in a storage device various types of configuration information received from the base station apparatus 10 or the user equipment 20 by the receiving unit 220 and reads out the configuration information from the storage device as needed. The configuring unit 230 also stores configuration information configured in advance. The contents of the configuration information are, for example, information about configuration of D2D communication.

As described in the embodiment, the control unit 240 controls D2D communication with another user equipments 20. The control unit 240 performs processing relating to HARQ for D2D communication. The control unit 240 may schedule D2D communication for another user equipment 20. The control unit 240 transmits a HARQ response of D2D communication to the user equipment 20 via the transmitting unit 210 with a transmission power set or a transmission power defined in advance. A functional unit for transmitting signals in the control unit 240 may be included in the transmitting unit 210, and a functional unit for receiving signals in the control unit 240 may be included in the receiving unit 220.

<Hardware Configuration>

The block diagrams (FIGS. 14 and 15) used for explaining the above embodiment illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmitting unit or a transmitter. As described above, a method for implementing these functions is not particularly limited.

Figure 16:
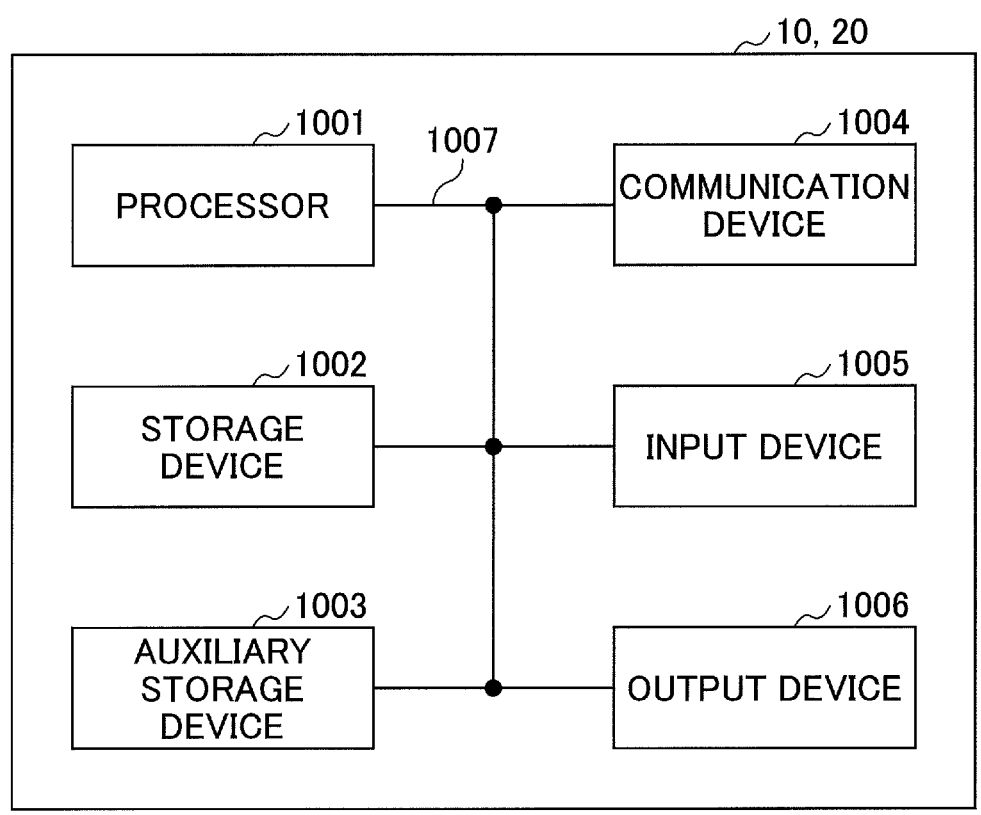
FIG. 16 is a drawing illustrating an example of a hardware configuration of a base station apparatus 10 or a user equipment 20 according to an embodiment of the present invention.

For example, the base station apparatus 10, the user equipment 20, and the like according to one embodiment of the present disclosure may function as a computer that performs processing of a wireless communication according to the present disclosure. FIG. 16 is a drawing illustrating an example of a hardware configuration of the base station apparatus 10 or the user equipment 20 according to an embodiment of the present disclosure. Each of the base station apparatus 10 and user equipment 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station apparatus 10 and the user equipment 20 may be configured to include one or more of the devices illustrated in drawings, or may be configured not to include some of the devices.

Each function of the base station apparatus 10 and the user equipment 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be realized by the processor 1001.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the base station apparatus 10, as illustrated in FIG. 14, may be implemented by a control program that is stored in the storage device 1002 and that is executed by the processor 1001. Also, for example, the control unit 240 of the user equipment 20, as illustrated in FIG. 15, may be implemented by a control program that is stored in the storage device 1002 and that is executed by the processor 1001. Explanation has been provided above for the case in which the above various processings are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The auxiliary storage device 1003 may be referred to as a storage. The above storage medium may be, for example, a database including at least one of the storage device 1002 and the auxiliary storage device 1003, a server, or other appropriate media.

The communication device 1004 is hardware (a transmission and reception device) for performing communication between computers through at least one of a wired network and a wireless network and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station apparatus 10 and the user equipment 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

Summary of Embodiment

As described above, according to an embodiment of the present invention, provided is a user equipment including a transmitting unit configured to transmit a groupcast to a group including a plurality of user equipments, a receiving unit configured to receive a response related to a retransmission control for the groupcast, and a control unit configured to control a leakage power to another channel arranged by frequency division with a channel via which a response related to the retransmission control for the groupcast is received.

According to the above configuration, the user equipment 20 can suppress leakage power from PSFCH to adjacent channels according to either a method of fixedly setting the transmission power of PSFCH via which a HARQ response is transmitted or a method of dynamically setting the transmission power of PSFCH via which a HARQ response is transmitted. Therefore, a response related to retransmission control can be appropriately transmitted in direct communication between terminals.

Regarding the channel via which the response related to the retransmission control for the groupcast is received, a guard region may be arranged between the channel and the another channel. According to the above configuration, the user equipment 20 may suppress the leakage power from PSFCH to adjacent channels by the PSFCH channel arrangement including the guard subcarrier.

The control unit may transmit, to the group, information indicating a transmission power to be applied to the channel via which the response related to the retransmission control for the groupcast is received, the transmission power being determined based on a status of the groupcast. According to the above configuration, the leakage power from PSFCH to adjacent channels can be suppressed by the method of dynamically setting the transmission power of PSFCH via which a HARQ response is transmitted.

The status of the groupcast is a number of user equipments included in the group or a power offset value with respect to a transmission power of a channel via which the groupcast is transmitted. According to the above configuration, based on the number of reception-side user equipments 20 included in the group or the power offset value with respect to the transmission power of the groupcast, the leakage power from PSFCH to adjacent channels can be suppressed by the method of dynamically setting the transmission power of PSFCH via which a HARQ response is transmitted.

The control unit may transmit, to a base station apparatus, the status of the groupcast together with a scheduling request of the groupcast, and may receive, from the base station apparatus, the information indicating the transmission power to be applied to the channel via which the response related to the retransmission control for the groupcast is received, the transmission power being determined based on the status of the groupcast. According to the above configuration, based on information indicating the transmission power of PSFCH received from the base station apparatus 10, the leakage power from PSFCH to adjacent channels can be suppressed by the method of dynamically setting the transmission power of PSFCH via which a HARQ response is transmitted.

According to an embodiment of the present invention, provided is a base station apparatus including a receiving unit configured to receive a status of a groupcast from a user equipment, a control unit configured to determine a transmission power applied to a channel via which a response related to a retransmission control for the groupcast is received, based on the status of the groupcast, and a transmitting unit configured to transmit, to the user equipment, information indicating the transmission power to be applied to the channel via which the response related to the retransmission control for the groupcast is received.

According to the above configuration, the base station apparatus 10 can suppress the leakage power from PSFCH to adjacent channels by the method of dynamically setting the transmission power of PSFCH via which a HARQ response is transmitted. Therefore, a response related to retransmission control can be appropriately transmitted in direct communication between terminals.

Supplements to Embodiment

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 10 and the user equipment 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the indication of information is not limited to the aspect or embodiment described in the present disclosure, but may be performed by other methods. For example, the indication of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user equipment 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. But the another network node may be a combination of a plurality of other network nodes (for example, a MME and a S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a user equipment, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Things) device such as a sensor.

In addition, a base station according to the present disclosure may be read as a user terminal. For example, each aspect or embodiment of the present disclosure may be applied to a configuration in which communication between a base station and a user terminal is replaced by communication between a plurality of user equipments (that may be called D2D (Device-to-Device), V2X (Vehicle-to-Everything), or the like). In this case, a user equipment 20 may have above-described functions of the base station apparatus 10. In this regard, a word such as "up" or "down" may be replaced with a word corresponding to communication between terminals (for example, "side"). For example, an uplink channel, a downlink channel, or the like may be replaced with a side channel.

Similarly, a user terminal according to the present disclosure may be read as a base station. In this case, a base station may have above-described functions of the user terminal.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing two or more elements. Therefore, references to first and second elements do not mean that only the two elements can be employed or that the first element should be, in some way, prior to the second element.

"Means" in each of the above-described apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiple Access) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit for transmitting a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to assign, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel. 8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in an RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following the article is of a plural form.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. indication of predetermined information (for example, indication of "being x") may be implemented not only explicitly but also implicitly (for example, by not indicating predetermined information).

In the present disclosure, sidelink communication is an example of direct communication between terminals. An HARQ response is an example of a response related to retransmission control. PSFCH is an example of a channel that receives an HARQ response. A guard subcarrier, a guard band, a guard PRB, or a guard subchannel are examples of a guard region. PSCCH or PSSCH is an example of a channel via which groupcast is transmitted.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims.

Therefore, the descriptions of the present disclosure are for illustrative purposes only, and are not intended to be limiting the present disclosure in any way.

REFERENCE SIGNS LIST 10 base station apparatus
110 transmitting unit
120 receiving unit
130 configuring unit
140 control unit
20 user equipment
210 transmitting unit
220 receiving unit
230 configuring unit
240 control unit
1001 processor
1002 storage device
1003 auxiliary storage device
1004 communication device
1005 input device
1006 output device

The invention claimed is:

1. A terminal comprising:
a receiving unit configured to receive a groupcast from another terminal, the groupcast being a transmission targeting a plurality of terminals;
a control unit configured to determine a fixed value, for each terminal, based on the number of terminals comprising the plurality of terminals, of transmission power to be applied to a Physical Sidelink Feedback Channel (PSFCH) via which a response related to a retransmission control for the groupcast is transmitted; and
a transmitting unit configured to transmit the response related to the retransmission control for the groupcast.

2. The terminal according to claim 1, wherein the control unit dynamically determines the transmission power to be applied to the PSFCH via which the response related to the retransmission control for the groupcast.

3. The terminal according to claim 2, wherein the transmitting unit transmits the PSFCH in a case where the response related to the retransmission control is NACK.

4. The terminal according to claim 1, wherein the transmitting unit transmits the PSFCH in a case where the response related to the retransmission control is NACK.

5. The terminal according to claim 1, wherein the fixed value does not depend on a reception state of the groupcast.

6. A communication method executed by a terminal, comprising:
receiving a groupcast from another terminal, the groupcast being a transmission targeting a plurality of terminals;
determining, for each terminal, based on the number of terminals comprising the plurality of terminals, a fixed value of transmission power to be applied to a Physical Sidelink Feedback Channel (PSFCH) via which a response related to a retransmission control for the groupcast is transmitted; and transmitting the response related to the retransmission control for the groupcast.

\* \* \* \* \*